United States Patent Office 3,553,232
Patented Jan. 5, 1971

3,553,232
4-(1,4,5,6-TETRAHYDROAZEPINE[4,5-b]INDOLE-3(2H)-YL)BUTYROPHENONES
Jackson B. Hester, Jr., Portage, Mich., assignor to The Upjohn Company, Kalamazoo, Mich., a corporation of Delaware
No Drawing. Filed Aug. 25, 1967, Ser. No. 663,244
Int. Cl. C07d 57/02
U.S. Cl. 260—326.5                 10 Claims

ABSTRACT OF THE DISCLOSURE

The novel 4 - (1,4,5,6-tetrahydroazepino[4,5-b]indol-3(2H)-yl)butyrophenones of Formula III:

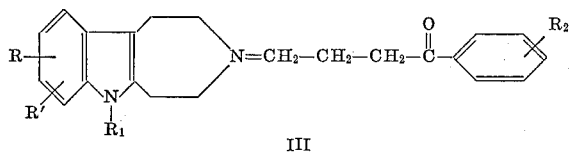

wherein R, R' and $R_2$ can be hydrogen, lower-alkoxy, lower-alkyl or halogen, and $R_1$ can be hydrogen or lower-alkyl, are produced by reacting a selected 1,2,3,4,5,6-hexahydroazepino[4,5-b]indole with a selected 4-halobutyrophenone in the presence of a base capable of neutralizing the hydrogen halide formed in this reaction. The novel compounds (III) including the acid addition salts thereof are tranquillizers, useful in the treatment of aggressive behavior or states of anxiety in mammals.

CROSS-REFERENCES TO RELATED APPLICATION

This application is related to the application S.N. 548,880 filed May 10, 1966 and now abandoned.

BACKGROUND OF THE INVENTION

Field of the invention

This invention relates to novel organic compounds and is more particularly concerned with 4-(1,4,5,6-tetrahydroazepino[4,5-b]indol-3(2H)-yl)butyrophenones, the acid addition salts thereof, particularly the pharmaceutically acceptable acid addition salts thereof, and the process of production therefor.

SUMMARY OF THE INVENTION

The novel compounds (III) and the process of this invention can be illustratively represented by the following sequence of formulae:

chlorine and bromine; wherein $R_1$ is selected from the group consisting of hydrogen and lower-alkyl, defined as above, and wherein Hal is selected from the group consisting of chlorine and bromine.

The process of the present invention consists in treating a selected 1,2,3,4,5,6-hexahydroazepino[4,5-b]indole (I), in an organic inert solvent, with a selected 4-halobutyrophenone (II) in the presence of a base, e.g., sodium carbonate, to neutralize the hydrogen halide formed during the reaction. A catalytic amount of potassium iodide may be used to facilitate the reaction. The thus-obtained compound III when treated with an acid yields the corresponding acid addition salt.

DESCRIPTION OF THE PREFERRED EMBODIMENTS

Examples of alkyl groups containing from 1 to 3 carbon atoms, inclusive, are methyl, ethyl, propyl and isopropyl.
Examples of alkoxy groups containing from 1 to 3 carbon atoms, inclusive, are methoxy, ethoxy, propoxy and isopropoxy.

The present invention also embraces the organic and inorganic acid addition salts of the novel amino compounds of Formula III such as the hydrochlorides, hydrobromides, hydroiodides, perchlorates, fluosilicates, thiocyanates, sulfates, cyclohexanesulfamates, acetates, propionates, laurates, palmitates, maleates, tartrates, lactates, citrates, oxalates, trifluoroacetates, trichloroacetates and the like.

The novel compounds of Formula III are tranquillizers and sedatives and act as antidepressants and as anorexigenic agents. Illustratively, the isolation-induced aggressive behavior of mice under the influence of 4'-fluoro-4-(1,4,5,6-tetrahydroazepino[4,5 - b]indol - 3(2H) - yl)butyrophenone [administered as hydrochloride, 10–15 mg. per kg. body weight] is effectively relieved.

The novel compounds of Formula III and the acid addition salts thereof show by the Apomorphine Cage Climbing Test, Pit Avoidance Test, anorexigenic tests in rats and mice, Overt Behavior Test in cats [S. Norton, "Behavioral Patterns as a Technique for Studying Psychotropic Drugs," Garattini and Ghetti, editors, Elsevier 1957] high tranquillizing, sedative and anticonvulsant effects.

The novel compounds of Formula III including their pharmacologically acceptable acid addition salts, e.g., hydrochlorides, sulfates, cyclohexanesulfamates, maleates, tartrates, citrates and the like, can be administered to

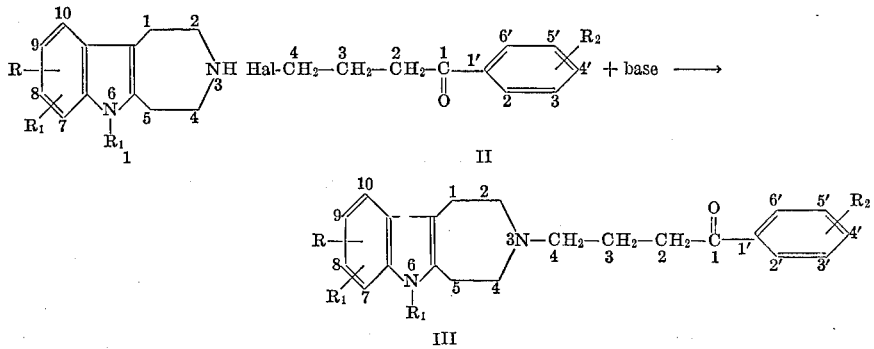

wherein R, R' and $R_2$ are selected from the group consisting of hydrogen, lower-alkyl and lower-alkoxy containing from 1 to 3 carbon atoms, inclusive, fluorine, animals for the purpose of tranquillization; e.g., these compounds have importance for administration to animals which are transported by airplane, ship, train, truck and so on. Administration to cattle, horses, dogs, cats, or the like, or zoo animals on long voyages, in a quantity between 1 to 20 mg./kg. of body weight produces tranquillization and thereby reduces losses of valuable animals due to overexcitement and fights among the caged animals. These compounds III are also of importance for the treatment of obesity and for treatment of excited states.

The novel compounds of Formula III can be administered to mammals and birds by both oral and parenteral routes in order to produce their pharmacological effects. For oral administration, unit dosage forms such as tablets, capsules, powders, granules, syrups, elixirs and the like containing the appropriate amount for treatment are used. For tablets, common pharmaceutical carriers such as starch, lactose, kaolin, dicalcium phosphate and the like are employed. Powders may also be used in gelatin capsules with or without carriers such as methylcellulose, magnesium stearate, calcium stearate, talc and the like. For fluid preparation, these compounds may be dissolved or suspended in aqueous alcoholic vehicles with or without buffering agents and with flavoring mixtures.

Acid addition salts of the Formula III amino compounds, which salts are not per se useful in therapy, have a variety of applications. Thus, for example, the fluosilicates of these compounds form useful mothproofing agents as described in U.S. Pats. 1,915,334 and 2,075,359. The thiocyanates of the same compounds, when condensed with formaldehyde, form resinous polymers which according to U.S. Pats. 2,425,320 and 2,606,155 are useful as pickling inhibitors. The trichloroacetates of the amino compounds of Formula III are useful as herbicides, for example, against Johnson grass, yellow foxtail, green foxtail, Bermuda grass and quackgrass.

The starting compounds (I) for this invention are shown in the preparations. The reagent compounds, 4-halobutyrophenones of Formula II, are prepared by reacting benzene or a selected substituted benzene with a 4-halobutyryl chloride in the presence of an aluminum chloride catalyst (Friedel-Crafts reaction). British patent specification 881,894 discloses such 4-halobutyrophenones.

In carrying out the process of the present invention a selected 1,2,3,4,5,6-hexahydroazepino[4,5-b]indole (I) is heated with a selected 4-halobutyrophenone (II) in an inert organic solvent in the presence of a base. In the preferred embodiment of this invention the inert organic solvent is selected from the group consisting of dialkylalkanoamides, e.g., dimethylformamide, dimethylacetamide and the like, aromatic hydrocarbons, e.g., benzene, toluene, xylenes, ethylbenzene and the like, ketones, e.g., methyl ethyl ketone, 4-methyl-2-pentanone, diisopropyl ketone, ethers, e.g., tetrahydrofuran and the like. The reaction can be carried out at a temperature between 60 and 150° C. with reflux temperature preferred, during a period of 5 to 72 hours. The base for neutralizing the hydrogen halide formed during the reaction is conveniently sodium or potassium carbonate or bicarbonate. Potassium iodide crystals up to 0.5% in weight compared to the weight of the reactants and a nitrogen atmosphere are utilized in the preferred embodiment of this invention. The reactants, i.e., a selected 1,2,3,4,5,6-hexahydroazepino [4,5-b]indole and a selected 4-halobutyrophenone are usually employed in a 1:1 up to 1:2 molar equivalent ratio. At the termination of the reaction the product is isolated and purified by conventional procedures, such as extraction, chromatography, crystallization and the like. Treatment of the product with the calculated amount of an acid produces the corresponding acid addition salt of the thus-obtained 4 - (1,4,5,6 - tetrahydroazepino[4,5-b] indol-3(2H)-yl)-butyrophenone.

The following preparations and examples are illustrative of the process and product of the present invention, but are not to be construed as limiting.

PREPARATION 1

*1-benzoylhexahydro-4H-azepin-4-one*

(A) 1-BENZOYLHEXAMETHYLENEIMINE [1-BENZOYL-HEXAHYDRO-4H-AZEPINE]

Benzoyl chloride (60 ml.) in 200 ml. of Skellysolve B hexanes was added to a stirred, cooled (ice-bath) solution of 200 ml. of hexamethyleneimine in 800 ml. of Skellysolve B hexanes. The mixture was then washed several times with 1 N hydrochloric acid and with water, and filtered through anhydrous sodium sulfate. Evaporation of the Skellysolve B hexanes and distillation of the oily residue gave 40.5 g. of 1-benzoylhexamethyleneimine, B.P. 150–160° C./1 torr.

*Analysis.*—Calc'd for $C_{13}H_{17}NO$ (percent): N, 6.89. Found (percent): N, 6.54.

(B) FERMENTATION OF 1-BENZOYLHEXAMETHYLENEIMINE

A medium was prepared of 200 g. of cornsteep liquor (60% solids), 100 g. of commercial dextrose, and 10 l. of tap water. The pH was adjusted to between 4.8 and 5 and 10 ml. of lard oil was added as a foam preventive. This medium was sterilized and inoculated with a 72-hour vegetative growth of *Sporotrichum sulfurescens*, ATCC 7159, and after incubation for 24 hours at a temperature of about 28° C. using a rate of aeration of 0.5 l. per minute and agitation of 300 r.p.m., the substrate, 2 g. of 1-benzoylhexamethyleneimine in solution in a minimum amount of acetone (about 20 ml.) was then added to the fermentation. After an additional 72-hour period of incubation at the same temperature and aeration, the beer and mycelium were separated by filtration. The mycelium was washed with water and the wash water was added to the beer filtrate. The thus-obtained beer filtrate was extracted four times with a volume of methylene chloride equal to one-fourth the volume of the filtrate. The combined extracts were washed with one-fourth volume of distilled water and the solvent was removed by distillation to give a residue.

The residue thus obtained was chromatographed on Florisil (anhydrous magnesium silicate) and eluted with Skellysolve B hexanes containing increasing portions of acetone. The 25% acetone-75% Skellysolve B hexanes eluate gave about 250 mg. of 1-benzoylhexahydro-4H-azepin-4-one and the acetone eluate give 1 - benzoyl - 4-hydroxyhexahydro-4H-azepine determined by thin layer chromatography.

(C) OXIDATION OF 1-BENZOYL-4-HYDROXYHEXA-HYDRO-4H-AZEPINE

The 1-benzoyl-4 - hydroxyhexahydro - 4H - azepine thus obtained was dissolved in acetone and oxidized at room temperature by the addition of a visible excess of Jones' reagent (2.67 M chromic acid reagent prepared from 26.7 g. of chromium trioxide and 23 ml. of sulfuric acid, diluted to 100 ml. with water). The excess oxidant was destroyed by the addition of isopropyl alcohol and the mixture was evaporated to dryness. Water (20 ml.) was added, and the product was extracted with 20 ml. of methylene chloride. The extract was evaporated to dryness and the residual 1-benzoylhexahydro-4H-azepin-4-one thus obtained was combined with the same product obtained directly from the bio-conversion. The combined product was chromatographed on a column of Florisil (anhydrous magnesium silicate). The column was eluted with Skellysolve B hexanes containing increasing proportions of acetone and those fractions containing the desired product, as determined by thin layer chromatography, were combined and evaporated to give about 770 mg. of 1-benzoylhexahydro-4H-azepin-4-one as an oil, B.P. 170–174° C./0.3 torr, that crystallized slowly.

*Analysis.*—Calc'd for $C_{13}H_{15}NO_2$ (percent): C, 71.86; H, 6.96; N, 6.45. Found (percent): C, 71.51; H, 7.25; N, 6.46.

PREPARATION 2

*Phenylhydrazone of 1-benzoylhexahydro-4H-azepin-4-one*

A mixture of 20 g. (0.092 mole) of 1-benzoylhexahydro-4H-azepin-4-one, 10.5 g. of phenylhydrazine (0.097 mole), 200 ml. of absolute ethanol and 1.5 ml. of acetic acid was refluxed for a period of 1 hour and then cooled in an ice bath. Crystals formed which were collected by filtration, washed with ethanol and dried to yield 20.8 g. (74%) of the phenylhydrazone of 1-benzoylhexahydro-4H-azepin-4-one of melting point 185–190° C.

PREPARATION 3

*p-Methoxyphenylhydrazone of 1-benzoylhexahydro-4H-azepin-4-one*

A solution of 120.1 g. (0.869 mole) of p-methoxyphenylhydrazine, 172.0 g. (0.792 mole) of 1-benzoylhexahydro-4H-azepin-4-one and 12.9 ml. of glacial acetic acid in 1725 ml. of absolute ethanol was refluxed in a nitrogen atmosphere for a period of 1 hour. The reaction mixture was then cooled and concentrated under reduced pressure. The product which had crystallized from the solution was collected by filtration, washed with ethanol and dried to give 108.9 g. of 1-benzoylhexahydro-4H-azepin-4-one p-methoxyphenylhydrazone of melting point 155.5–166.5° C. A second crop was obtained by concentrating the mother liquors, providing an additional amount of 32.9 g. so that the total yield was 53%.

PREPARATION 4

*m-Methoxyphenylhydrazone of 1-benzoylhexahydro-4H-azepin-4-one*

To a 3 N aqueous sodium hydroxide solution (300 ml.) and ether (300 ml.) was added 62.7 g. (0.360 mole) of m-methoxyphenylhydrazine hydrochloride. This mixture was stirred until the material went into solution, the ether layer was separated and the aqueous layer extracted with additional ether. The ether layer and extracts were washed with brine, dried over anhydrous potassium carbonate and concentrated under reduced pressure at about 25° C. to give a residue. To a solution of the residue in 500 ml. of ethanol was added a solution of 1-benzoylhexahydro-4H-azepin-4-one (65 g.; 0.3 mole) in 300 ml. of ethanol and 5 ml. of acetic acid. The resulting solution was refluxed under nitrogen for 1 hour and then concentrated under reduced pressure. The product which crystallized from the partially concentrated reaction mixture was collected by filtration, washed with ethanol and dried to give 45.2 g. (44.7%) of m-methoxyphenylhydrazone of 1-benzoylhexahydro-4H-azepin-4-one of melting point 153–159° C.

PREPARATION 5

*o-Methoxyphenylhydrazone of 1-benzoylhexahydro-4H-azepin-4-one*

To a stirred mixture of 3 N aqueous sodium hydroxide (300 ml.) and 300 ml. of ether was added 62.7 g. (0.360 mole) of o-methoxyphenylhydrazine hydrochloride. After solution was achieved, the aqueous layer was saturated with sodium chloride, separated from the ether layer and extracted with ether. The combined ether layer and extracts were washed with brine, dried over potassium carbonate and concentrated under reduced pressure at 25° C. to give a residue. The residue was dissolved in 500 ml. of ethanol and was thus added to a solution of 65 g. (0.300 mole) of 1-benzoylhexahydro-4H-azepin-4-one in 300 ml. of ethanol and 5 ml. of acetic acid. The mixture was refluxed for 1 hour and concentrated under reduced pressure. The resulting residue was crystallized from ethanol to give a total of 34.3 g. of o-methoxyphenylhydrazone of 1-benzoylhexahydro-4H-azepin-4-one of melting point 145–154° C.

PREPARATION 6

*p-Fluorophenylhydrazone of 1-benzoylhexahydro-4H-azepin-4-one*

To a stirred solution of 300 ml. of 3 N sodium hydroxide and 300 ml. of ether was added 58.3 g. (0.360 mole) of p-fluorophenylhydrazine hydrochloride. When solution was obtained, the aqueous layer was saturated with sodium chloride, separated from the ether layer and extracted with ether. The ether layer and extracts were combined, washed with brine, dried over anhydrous potassium carbonate and concentrated in vacuo (at about 25° C.) to give a residue. The residue was dissolved in 500 ml. of ethanol and was thus added to a solution of 65 g. (0.3 mole) of 1-benzoylhexahydro-4H-azepin-4-one in 300 ml. of ethanol and 5 ml. of acetic acid. The resulting solution was refluxed for 1 hour in a nitrogen atmosphere and concentrated under reduced pressure. The product which crystallized from the concentrated mixture was collected by filtration, washed with ethanol and dried to yield 32.7 g. (33.3%) of p-fluorophenylhydrazone of 1-benzoylhexahydro-4H-azepin-4-one of melting point 150–162° C.

PREPARATION 7

*o-Tolylhydrazone of 1-benzoylhexahydro-4H-azepin-4-one*

To 400 ml. of 3 N aqueous sodium hydroxide solution and 400 ml. of ether was added 79.3 g. (0.5 mole) of o-tolylhydrazine hydrochloride. After solution was obtained, the aqueous layer was saturated with sodium chloride, separated from the ether layer and extracted with ether. The combined ether layer and extracts were washed with brine, dried over anhydrous potassium carbonate and concentrated under reduced pressure at 25° C. to give a residue. This residue, dissolved in 700 ml. of ethanol, was mixed with a solution of 108.6 g. (0.5 mole) of 1-benzoylhexahydro-4H-azepin-4-one in 400 ml. of ethanol and 6.95 ml. of acetic acid. The resulting solution was refluxed for a period of 1 hour in a nitrogen atmosphere and then concentrated under reduced pressure. The residue which was obtained was crystallized from ethanol to give 29.7 g. of o-tolylhydrazone of 1-benzoylhexahydro-4H-azepin-4-one of melting point 135–141° C. Another crop was obtained of 4.85 g., thus providing a total yield of 21.5%.

PREPARATION 8

*p-Tolylhydrazone of 1-benzoylhexahydro-4H-azepin-4-one*

In the manner given in Preparation 7, a freshly prepared (from 58.5 g. of p-tolylhydrazine hydrochloride) ethanol solution of p-tolylhydrazine was reacted in the presence of acetic acid and in ethanol solution with 1-benzoylhexahydro-4H-azepin-4-one (160 g.) to give in two crops 26.9 g. of p-tolylhydrazone of 1-benzoylhexahydro-4H-azepin-4-one of melting point 145–155° C.

PREPARATION 9

*p-Ethylphenylhydrazone of 1-benzoylhexahydro-4H-azepin-4-one*

In the same manner given in Preparation 2, 1-benzoylhexahydro-4H-azepin-4-one was heated with p-ethylphenylhydrazine in absolute ethanol in the presence of acetic acid to give p-ethylphenylhydrazone of 1-benzoylhexahydro-4H-azepin-4-one.

PREPARATION 10

*p-Propoxyphenylhydrazone of 1-benzoylhexahydro-4H-azepin-4-one*

In the manner given in Preparation 2, p-propoxyphenylhydrazine was heated with 1-benzoylhexahydro-4H-azepin-4-one in absolute ethanol in the presence of acetic acid to give p-propoxyphenylhydrazone of 1-benzoyl-hexahydro-4H-azepin-4-one.

PREPARATION 11

*o-Chlorophenylhydrazone of 1-benzoylhexhydro-4H-azepin-4-one*

In the manner given in Preparation 2, o-chlorophenylhydrazine was reacted with 1-benzoylhexahydro-4H-azepin-4-one in absolute ethanol in the presence of acetic acid to give o-chlorophenylhydrazone of 1-benzoylhexahydro-4H-azepin-4-one.

In the manner given in Preparation 2, other substituted phenylhydrazones of 1-benzoylhexahydro - 4H - azepin-4-one can be prepared by heating a selected substituted phenylhydrazine with 1-benzoylhexahydro-4H-azepin-4-one, dissolved in ethanol, in the presence of acetic acid. Representative compounds thus obtained include:

m-ethylphenylhydrazone;
o-ethylphenylhydrazone;
p-propylphenylhydrazone;
o-propylphenylhydrazone;
m-propylphenylhydrazone;
p-isopropylphenylhydrazone;
o-isopropylphenylhydrazone;
p-chlorophenylhydrazone;
o-bromophenylhydrazone;
m-fluorophenylhydrazone;
o-ethoxyphenylhydrazone;
m-ethoxyphenylhydrazone;
p-isopropoxyphenylhydrazone;
o-propoxyphenylhydrazone;
3,4-dichlorophenylhydrazone;
2,3-difluorophenylhydrazone;
2,3-dibromophenylhydrazone;
3,4-dimethylphenylhydrazone;
2,3-dimethylphenylhydrazone;
2,3-diethoxyphenylhydrazone;
2-ethoxy-3-fluorophenylhydrazone;
2-bromo-4-propoxyphenylhydrazone;
2-methyl-4-chlorophenylhydrazone;
3,4-dimethoxyphenylhydrazone;
3,5-dimethoxyphenylhydrazone;
and the like of 1-benzoylhexahydro-4H-azepin-4-one.

PREPARATION 12

*3-benzoyl-1,2,3,4,5,6-hexahydroazepino[4,5-b]indole*

A mixture of 5 g. (16.3 mmoles) of the phenylhydrazone of 1-benzoylhexahydro-4H-azepin-4-one and 35 ml. of 97% formic acid was heated on the steam bath in a nitgrogen atmosphere for 20 minutes. It was then poured into ice-water giving a dark brown solid which was collected by filtration, washed with water and dried in vacuo to yield 4.5 g. of a crude product. This material was chromatographed over 300 g. of silica gel with mixtures of 15–30% acetone, balance cyclohexane. The product thus obtained was evaporated and crystallized from methanol-water to give 1.9 g. (40%) of 3-benzoyl-1,2,3,4,6-hexahydroazepino[4,5 - b]indol of melting point 169–170° C.

*Analysis.*—Calc'd for $C_{19}H_{18}N_2O$ (percent): C, 78.59; H, 6.25; N, 9.65. Found (percent): C, 78.26; H, 6.22; N, 9.43.

PREPARATION 13

*3-benzoyl-9-methoxy-1,2,3,4,5,6-hexahydroazepino[4,5-b]indole*

To 100 ml. of about 3 N hydrogen chloride solution in absolute ethanol was added 3.37 g. (0.010 mole) of p - methoxyphenylhydrazone of 1-benzoylhexahydro-4H-azepin-4-one. This mixture was heated on the steam bath for a period of 7 minutes, then poured into ice water. The solid was collected by filtration, washed with water and dissolved in methylene chloride. The methylene chloride solution was dried over anhydrous magnesium sulfate, concentrated to about 10 ml. and poured over a column containing 250 g. of neutral alumina. The column was eluted with 80% ethyl acetate-20% Skellysolve B hexanes and the resulting product crystallized from ethyl acetate to yield 0.3 g. (9.37%) of 3-benzoyl-9-methoxy-1,2,3,4,5,6 - hexahydroazepino[4,5 - b]indole of melting point 129.5–133° C. (dec.).

PREPARATION 14

*3-benzoyl-8-methoxy-1,2,3,4,5,6-hexahydroazepino[4,5-b] indole and 3-benzoyl-10-methoxy - 1,2,3,4,5,6 - hexahydroazepino[4,5-b]indole*

A mixture of 43.9 g. (0.130 mole) of the m-methoxyphenylhydrazone of 1-benzoylhexahydro-4H-azepin-4-one and 195 ml. of 88% formic acid was heated on the steam bath in a nitrogen atmosphere for a period of 30 minutes. It was then cooled and poured into ice water. The resulting mixture was extracted with chloroform, the chloroform extracts were washed with water, dried over anhydrous magnesium sulfate and concentrated in vacuo. The resulting residue was chromatographed over 2.2 kg. of silica gel with a mixture of 60% ethyl acetate-40% cyclohexane. Twenty-five 1.5 l. fractions were collected. The first band, obtained from fractions 8–11, was crystallized from methylene chloride-ethyl acetate to yield 2.66 g. of 3 - benzoyl - 10 - methoxy - 1,2,3,4,5,6-hexahydroazepino[4,5-b]indole of melting point 263.5–267° C. A second crop of this material was obtained weighing 0.185 g. (total yield 6.83%). The product when recrystallized from methylene chloride-methanol gave pure 3-benzoyl - 10 - methoxy - 1,2,3,4,5,6 - hexahydroazepino [4,5-b]indole of melting point 264.5–266.5° C.

*Analysis.*—Calc'd for $C_{20}H_{20}N_2O_2$ (percent): C, 74.97; H, 6.29; N, 8.74. Found (percent): C, 74.49; H, 6.63; N, 9.01.

The second isomer, obtained from fractions 14–17, was crystallized from methylene chloride-ethyl acetate to give 5.86 g. of 3-benzoyl-8-methoxy-1,2,3,4,5,6-hexahydroazepino[4,5-b]indole of melting point 201.5–203° C. A second fraction of 3.98 g. of the same material was also obtained. Recrystallization of the product from methylene chloride-methanol gave pure 3 - benzoyl - 8 - methoxy-1,2,3,4,5,6 - hexahydroazepino[4,5-b]indole of melting point 202–203.5° C.

*Analysis.*—Calc'd for $C_{20}H_{20}N_2O_2$ (percent): C, 74.97; H, 6.29; N, 8.74. Found (percent): C, 74.77; H, 6.50; N, 8.62.

PREPARATION 15

*3-benzoyl-7-methoxy-1,2,3,4,5,6-hexahydroazepino [4,5-b]indole*

A mixture of 29.9 g. (0.0888 mole) of the o-methoxyphenylhydrazone of 1 - benzoylhexahydro - 4H - azepin-4-one and 88% formic acid (120 ml.) was heated on the steam bath in a nitrogen atmosphere for a period of 30 minutes and poured thereupon into 2.5 l. of ice water. This mixture was extracted with chloroform, the chloroform extracts were washed with water, dried over anhydrous potassium carbonate and concentrated under reduced pressure to give a residue. This residue was chromatographed over silica gel (1.5 kg.) and eluted with 60% ethyl acetate-40% cyclohexane. The product thus obtained was crystallized from methylene chloride-ethyl acetate to give 1.15 g. of 3-benzoyl-7-methoxy-1,2,3,4,5,6-hexahydroazepino[4,5-b]indole of melting point 203–204.5° C. A second crop of 0.754 g. was obtained of the same material providing a total yield of 6.69%.

*Analysis.*—Calc'd for $C_{20}H_{20}N_2O_2$ (percent): C, 74.97; H, 6.29; N, 8.74. Found (percent): C, 75.00; H, 6.45; N, 8.92.

PREPARATION 16

*3-benzoyl-9-fluoro-1,2,3,4,5,5-hexahydroazepino-[4,5-b]indole*

A mixture of 3.25 g. (0.01 mole) of the p-fluorophenylhydrazone of 1-benzoylhexahydro-4H-azepin-4-one in 88% formic acid (15 ml.) was refluxed, under nitrogen, for a period of 30 minutes and the reaction mixture was then poured into ice water. The resulting dark, semisolid mixture was extracted with chloroform. The chloroform extracts were washed with water and dried over anhydrous magnesium sulfate, treated with 10 g. of silica gel and concentrated under reduced pressure. The resulting granular solid was carefully poured onto a column of 200 g. of silica gel and chromatographed with 60% ethyl acetate-40% cyclohexane. The eluates were combined, concentrated and the resulting product crystallized from ethyl acetate-Skellysolve B hexanes to give 1.072 g. (34.8%) of 3-benzoyl-9-fluoro-1,2,3,4,5,6-hexahydroazepino[4,5-b]indole of melting point 131–133° C. This material was recrystallized from ethyl acetate-Skellysolve B hexanes to give 3-benzoyl-9-fluoro-1,2,3,4,5,6-hexahydroazepino[4,5-b]indole of melting point 165–167° C.

*Analysis.*—Calc'd for $C_{19}H_{17}N_2OF$ (percent): C, 74.00; H, 5.56; N, 9.09; F, 6.16. Found (percent): C, 73.57; H, 6.02; N, 8.89; F, 5.93.

PREPARATION 17

*3-benzoyl-7-methyl-1,2,3,4,5,6-hexahydroazepino-[4,5-b]indole*

A mixture of 31.3 g. (0.0975 mole) of the o-tolylhydrazone of 1-benzoylhexahydro-4H-azepin-4-one was refluxed in 290 ml. of 88% formic acid in a nitrogen atmosphere for a period of 30 minutes. The reaction mixture was poured into ice water, extracted several times with methylene chloride, the methylene chloride extracts were combined, dried over anhydrous magnesium sulfate and concentrated under reduced pressure to give a residue. This residue was chromatographed over 1.5 kg. of silica gel using 60% ethyl acetate-40% cyclohexane. The fractions were combined, crystallized and concentrated to give a solid which was recrystallized from ethyl acetate-Skelly-solve B hexanes to give 10.0 g. of 3-benzoyl-7-methyl - 1,2,3,4,5,6 - hexahydroazepino[4,5-b]indole of melting point 187–188.5° C. A second fraction of 1.26 g. of the same material was obtained raising the yield to 37.9%. Recrystallization of this material from ethyl acetate gave pure 3-benzoyl-7-methyl-1,2,3,4,5,6-hexahydroazepino[4,5-b]indole of melting point 189–190° C.

*Analysis.*—Calc'd for $C_{20}H_{20}N_2O$ (percent): C, 78.92; H, 6.62; N, 9.20. Found (percent): C, 78.70; H, 6.79; N, 8.99.

PREPARATION 18

*3-benzoyl-9-methyl-1,2,3,4,5,6-hexahydroazepino-[4,5-b]indole*

A stirred mixture of 26.9 g. (0.0837 mole) of the p-tolylhydrazone of 1-benzoylhexahydro-4H-azepine-4-one was refluxed with 125 ml. of 88% formic acid in a nitrogen atmosphere for a period of 30 minutes. The reaction mixture was poured into ice water, then extracted several times with chloroform. The chloroform extracts were washed with water, dried over anhydrous magnesium sulfate and concentrated under reduced pressure. The resulting residue was chromatographed on a column containing 1 kg. of silica gel, using a mixture of 60% ethyl acetate-40% cyclohexane. The eluates were combined and concentrated to give 10.33 g. of product (40.6% yield) which was recrystallized from methylene chloride-methanol to give pure 3-benzoyl-9-methyl-1,2,3,4,5,6-hexahydroazepino[4,5-b]indole of melting point 210–211° C.

*Analysis.*—Calc'd for $C_{20}H_{20}N_2O$ (percent): C, 78.92; H, 6.62; N, 9.20. Found (percent): C, 78.30; H, 6.80; N, 9.10.

PREPARATION 19

*3-benzoyl-7-chloro-1,2,3,4,5,6-hexahydroazepino-[4,5-b]indole*

In the manner given in Preparation 12, the o-chloro-phenylhydrazone of 1-benzoylhexahydro-4H-azepin-4-one was heated in formic acid to give 3-benzoyl-7-chloro-1,2,3,4,5,6-hexahydroazepino[4,5-b]indole.

PREPARATION 20

*3-benzoyl-9-ethyl-1,2,3,4,5,6-hexahydroazepino-[4,5-b]indole*

In the manner given in Preparation 12, the p-ethylphenylhydrazone of 1-benzoylhexahydro-4H-azepin-4-one was heated in formic acid to give 3-benzoyl-9-ethyl-1,2,3,4,5,6-hexahydroazepino[4,5-b]indole.

PREPARATION 21

*3-benzoyl-9-propoxy-1,2,3,4,5,6-hexahydroazepino-[4,5-b]indole*

In the manner given in Preparation 12, the p-propoxyphenylhydrazone of 1-benzoylhexahydro-4H-azepin-4-one was heated in formic acid to give 3-benzoyl-9-propoxy-1,2,3,4,5,6-hexahydroazepino[4,5-b]indole.

In the same manner given in Preparation 12, other 3-benzoyl-substituted 1,2,3,4,5,6 - hexahydroazepino[4,5-b] indoles are obtained by heating a substituted phenylhydrazone of 1-benzoylhexahydro-4H-azepin-4-one with formic acid. Representative compounds, thus obtained, include:

3-benzoyl-8-ethyl-1,2,3,4,5,6-hexahydroazepino[4,5-b] indole;
3-benzoyl-10-ethyl-1,2,3,4,5,6-hexahydroazepino[4,5-b] indole;
3-benzoyl-7-ethyl-1,2,3,4,5,6-hexahydroazepino[4,5-b] indole;
3-benzoyl-9-propyl-1,2,3,4,5,6-hexahydroazepino[4,5-b] indole;
3-benzoyl-7-propyl-1,2,3,4,5,6-hexahydroazepino[4,5-b] indole;
3-benzoyl-8-propyl-1,2,3,4,5,6-hexahydroazepino[4,5-b] indole;
3-benzoyl-10-propyl-1,2,3,4,5,6-hexahydroazepino[4,5-b] indole;
3-benzoyl-9-isopropyl-1,2,3,4,5,6-hexahydroazepino-[4,5-b]indole;
3-benzoyl-7-isopropyl-1,2,3,4,5,6-hexahydroazepino-[4,5-b]indole;
3-benzoyl-9-chloro-1,2,3,4,5,6-hexahydroazepino-[4,5-b]indole;
3-benzoyl-7-bromo-1,2,3,4,5,6-hexahydroazepino[4,5-b] indole;
3-benzoyl-8-fluoro-1,2,3,4,5,6-hexahydroazepino[4,5-b] indole;
3-benzoyl-10-fluoro-1,2,3,4,5,6-hexahydroazepino[4,5-b] indole;
3-benzoyl-7-ethoxy-1,2,3,4,5,6-hexahydroazepino[4,5-b] indole;
3-benzoyl-8-ethoxy-1,2,3,4,5,6-hexahydroazepino[4,5-b] indole;
3-benzoyl-9-isopropoxy-1,2,3,4,5,6-hexahydroazepino-[4,5-b]indole;
3-benzoyl-8,9-dichloro-1,2,3,4,5,6-hexahydroazepino-[4,5-b]indole;
3-benzoyl-9,10-dichloro-1,2,3,4,5,6-hexahydroazepino-[4,5-b]indole;
3-benzoyl-7,8-difluoro-1,2,3,4,5,6-hexahydroazepino-[4,5-b]indole;
3-benzoyl-7,8-dibromo-1,2,3,4,5,6-hexahydroazepino-[4,5-b]indole;
3-benzoyl-8,9-dimethyl-1,2,3,4,5,6-hexahydroazepino-[4,5-b]indole;
3-benzoyl-9,10-dimethyl-1,2,3,4,5,6-hexahydroazepino-[4,5-b]indole;
3-benzoyl-7,8-dimethyl-1,2,3,4,5,6-hexahydroazepino-[4,5-b]indole;
3-benzoyl-7,8-diethoxy-1,2,3,4,5,6-hexahydroazepino-[4,5-b]indole;

3-benzoyl-7-ethoxy-8-fluoro-1,2,3,4,5,6-hexahydro-
azepino[4,5-b]indole;
3-benzoyl-7-bromo-9-propoxy-1,2,3,4,5,6-hexahydro-
azepino[4,5-b]indole;
3-benzoyl-7-methyl-9-chloro-1,2,3,4,5,6-hexahydro-
azepino[4,5-b]indole;
3-benzoyl-8,9-dimethoxy-1,2,3,4,5,6-hexahydroazepino-
[4,5-b]indole;
3-benzoyl-8,10-dimethoxy-1,2,3,4,5,6-hexahydroazepino-
[4,5-b]indole;
and the like.

PREPARATION 22

*3-benzyl-1,2,3,4,5,6-hexahydroazepino[4,5-b]indole*

To a stirred mixture of 6 g. of lithium aluminum hydride in 400 ml. of dry tetrahydrofuran was added a solution of 6 g. (20.6 mmoles) of 3-benzoyl-1,2,3,4,5,6-hexahydroazepino[4,5-b]indole in 150 ml. of tetrahydrofuran. The addition was carried out in a nitrogen atmosphere during one hour. The resulting mixture was stirred at room temperature (about 25° C.) for about 4 hours and then refluxed for 18 hours. The mixture was then cooled in an ice bath and treated first with 6 ml. of water, then with 6 ml. of 15% sodium hydroxide solution and then with 18 ml. of water. This mixture was stirred for 2 hours and then filtered. The filtrate was concentrated under reduced pressure to give a residue and the residue was crystallized from ethyl acetate-Skellysolve B hexanes to give 3.37 g. (59%) of 3-benzyl-1,2,3,4,5,6-hexahydro-azepino[4,5-b]indole of melting point 116–117° C.

*Analysis.*—Calc'd for $C_{19}H_{20}N_2$ (percent): C, 82.57; H, 7.30; N, 10.14. Found (percent): C, 82.34; H, 7.52; N, 10.04.

PREPARATION 23

*3-benzyl-9-methoxy-1,2,3,4,5,6-hexahydroazepino[4,5-b]indole*

To an ice-cold suspension of 1 g. of lithium aluminum hydride in 100 ml. of tetrahydrofuran was added 1 g. (0.00312 mole) of 3-benzoyl-9-methoxy-1,2,3,4,5,6-hexahydroazepino[4,5-b]indole and the mixture was refluxed in a nitrogen atmosphere for a period of 18 hours. Thereafter, the mixture was cooled in an ice bath and treated successively with 1 ml. of water, 1 ml. of 15% aqueous sodium hydroxide solution and 3 ml. of water. The resulting mixture was filtered and the filtrate concentrated in vacuo to give a solid which was recrystallized from ethyl acetate to give 0.773 g. (81%) of product which again was recrystallized from ethyl acetate-Skellysolve B hexanes to give pure 3-benzyl-9-methoxy-1,2,3,4,5,6-hexahydroazepino[4,5-b]indole of melting point 127.5–129.5° C.

*Analysis.*—Calc'd for $C_{20}H_{22}N_2O$ (percent): C, 78.40; H, 7.24; N, 9.14. Found (percent): C, 78.54; H, 7.35; N, 9.42.

PREPARATION 24

*3-benzyl-8-methoxy-1,2,3,4,5,6-hexahydroazepino[4,5-b]indole*

To a stirred, ice-cold suspension of 9 g. of lithium aluminum hydride in 900 ml. of tetrahydrofuran was added 8.83 g. (0.0279 mole) of 3-benzoyl-8-methoxy-1,2,3,4,5,6-hexahydroazepino[4,5-b]indole. The mixture was refluxed in a nitrogen atmosphere for a period of 18 hours, cooled in an ice bath and treated successively with 9 ml. of water, 9 ml. of 15% aqueous sodium hydroxide and 27 ml. of water. The mixture was then filtered, the filtrate evaporated, the residue crystallized from ethyl acetate to give 6.62 g. (77.4%) of product which upon recrystallization from ethyl acetate gave 3-benzyl - 8 - methoxy-1,2,3,4,5,6-hexahydroazepino[4,5-b] indole of melting point 146.5–147° C.

*Analysis.*—Calc'd for $C_{20}H_{22}N_2O$ (percent): C, 78.40; H, 7.24; N, 9.14. Found (percent): C, 78.25; H, 7.44; N, 9.33.

PREPARATION 25

*3-benzyl-10-methoxy-1,2,3,4,5,6-hexahydroazepino [4,5-b]indole*

To an ice-cold, stirred suspension of lithium aluminum hydride (3 g.) in 300 ml. of tetrahydrofuran was added 2.35 g. (7.26 mmoles) of 3-benzoyl-10-methoxy-1,2,3,4,5,6-hexahydroazepino[4,5-b]indole. This mixture was refluxed for 18 hours in a nitrogen atmosphere, then cooled in an ice bath and treated successively with 3 ml. of water, 3 ml. of 15% aqueous sodium hydroxide and 9 ml. of water. The mixture was thereupon filtered, the collected solids washed with tetrahydrofuran and the washings and filtrate combined and concentrated to give a solid crude product. This product was crystallized from ethyl acetate-Skellysolve B hexanes to give 1.85 g. (83.3%) of 3-benzyl - 10 - methoxy - 1,2,3,4,5,6 - hexahydroazepino-[4,5-b]indole, which after recrystallization from the same solvent mixture had a melting point of 163.5–164.5° C.

*Analysis.*—Calc'd for $C_{20}H_{22}N_2O$ (percent): C, 78.40; H, 7.24; N, 9.14. Found (percent): C, 78.80; H, 7.42; N, 9.03.

PREPARATION 26

*3-benzyl-7-methoxy-1,2,3,4,5,6-hexahydroazepino[4,5-b] indole hydrochloride*

To a stirred, ice-cold suspension of 2 g. of lithium aluminum hydride in 200 ml. of tetrahydrofuran was added 1.85 g. (5.77 mmoles) of 3-benzoyl-7-methoxy-1,2,3,4,5,6-hexahydroazepino[4,5-b]indole. The resulting mixture was refluxed for 18 hours in a nitrogen atmosphere and then decomposed by the successive addition of 2 ml. of water, 15% aqueous sodium hydroxide (2 ml.) and 6 ml. of water. The resulting mixture was filtered and the filtrate concentrated under reduced pressure to give a residue. A solution of this residue in ethyl acetate was acidified with methanolic hydrogen chloride, and the resulting crystalline hydrochloride was collected by filtration and dried to yield 1.81 g. (91.5%) of 3-benzyl-7-methoxy - 1,2,3,4,5,6 - hexahydroazepino[4,5-b]indole hydrochloride of melting point 251–252.5° C. The recrystallized material from methanol-ethyl acetate melted at 247–248° C. (dec.).

*Analysis.*—Cal'd for $C_{20}H_{23}ClN_2O$ (percent): C, 70.06; H, 6.76; N, 8.17; Cl, 10.34. Found (percent): C, 17.15; H, 6.94; N, 8.12; Cl, 10.32.

PREPARATION 27

*3-benzyl-9-fluoro-1,2,3,4,5,6-hexahydroazepino-[4,5-b]indole*

To a stirred, ice-cold suspension of 8 g. of lithium aluminum hydride in 800 ml. of dry tetrahydrofuran was added 6.94 g. (0.0225 mole) of 3-benzoyl-9-fluoro-1,2,3,4,5,6-hexahydroazepino[4,5-b]indole. The resulting mixture was refluxed for 10 hours under nitrogen, cooled in an ice bath and treated successively with 8 ml. of water, 8 ml. of 15% aqueous sodium hydroxide and 24 ml. of water. The mixture was filtered, the solids washed with tetrahydrofuran and the filtrate combined with the washings was concentrated in vacuo to give a residue. The residue was crystallized from ethyl acetate to yield 5.53 g. (83.6%) of product which after additional recrystallization from ethyl acetate give 3-benzyl-9-fluoro-1,2,3,4,5,6-hexahydroazepino[4,5-b]indole of melting point 143–144° C.

*Analysis.*—Calc'd for $C_{19}H_{19}N_2F$ (percent): C, 77.52; H, 6.51; N, 9.52; F, 6.45. Found (percent): C, 77.81; H, 6.52; N, 9.25; F, 6.25.

PREPARATION 28

*3-benzyl-7-methyl-1,2,3,4,5,6-hexahydroazepino-[4,5-b]indole hydrochloride*

A solution of 11.6 g. (0.0376 mole) of 3-benzoyl-7-methyl-1,2,3,4,5,6-hexahydrazepino[4,5-b]indole in 300 ml. of tetrahydrofuran was added under nitrogen to an ice-cold, stirred suspension of 11 g. of lithium aluminum hydride in 700 ml. of tetrahydrofuran. The resulting mixture was refluxed for 18 hours, cooled in an ice bath and treated successively with 11 ml. of water, 11 ml. of 15% sodium hydroxide and 33 ml. of water. This mixture was filtered and the filtrate concentrated under reduced pressure. A solution of the residual oil in ethyl acetate was acidified with methanolic hydrogen chloride to yield 5.15 g. (41.9%) of 3-benzyl-7-methyl-1,2,3,4,5,6-hexahydroazepino[4,5-b]indole hydrochloride which after recrystallization from methanol-ethyl acetate melted at 210.5–212° C.

*Analysis.*—Cal'd for $C_{20}H_{23}N_2Cl$ (percent): C, 73.49; H, 7.09; N, 8.57; Cl, 10.85. Found (percent): C, 73.09; H, 7.27; N, 8.18; Cl, 10.60.

PREPARATION 29

*3-benzyl-9-methyl-1,2,3,4,5,6-hexahydroazepino-[4,5-b]indole*

A solution of 9.56 g. (0.0310 mole) of 3-benzoyl-9-methyl-1,2,3,4,5,6-hexahydroazepino[4,5-b]indole in 300 ml. of tetrahydrofuran was added under a nitrogen atmosphere to a stirred, ice-cold suspension of 10 g. of lithium aluminum hydride in 700 ml. of tetrahydrofuran. The resulting mixture was refluxed for 16 hours, cooled in an ice bath and treated successively with water (10 ml.), 10 ml. of 15% aqueous sodium hydroxide and 30 ml. of water. This mixture was allowed to stir for 1 hour, was then filtered and the filtrate concentrated in vacuo to give an oil which was crystallized from ethyl acetate to give three crops of product: 7.27 g. melting at 140.5–142° C., 0.702 g. melting at 129–136° C. and 0.395 g. melting at 123.5–134° C. of 3-benzyl-9-methyl-1,2,3,4,5,6-hexahydroazepino[4,5-b]indole (93% yield). Recrystallizing this material from ethyl acetate-Skellysolve B hexanes gave a pure product melting at 142.5–143.5° C.

*Analysis.*—Cal'd for $C_{20}H_{22}N_2$ (percent): C, 82.72; H, 7.64; N, 9.65. Found (percent): C, 82.38; H, 7.91; N, 9.96.

PREPARATION 30

*3-benzyl-7-chloro-1,2,3,4,5,6-hexahydroazepino-[4,5-b]indole*

In the manner given in Preparation 22, 3-benzyl-7-chloro - 1,2,3,4,5,6 - hexahydroazepino[4,5-b]indole was reduced with lithium aluminum hydride to give 3-benzyl-7-chloro-1,2,3,4,5,6-hexahydroazepino[4,5-b]indole.

PREPARATION 31

*3-benzyl-9-ethyl-1,2,3,4,5,6-hexahydroazepino-[4,5-b]indole*

In the manner given in Preparation 22, 3-benzyl-9-ethyl-1,2,3,4,5,6-hexahydroazepino[4,5-b]indole was reduced with lithium aluminum hydride to give 3-benzyl-9-ethyl-1,2,3,4,5,6-hexahydroazepino[4,5-b]indole.

PREPARATION 32

*3-benzyl-9-propoxy-1,2,3,4,5,6-hexahydroazepino-[4,5-b]indole*

In the manner given in Preparation 22, 3-benzoyl-9-propoxy-1,2,3,4,5,6-hexahydroazepino[4,5-b]indole was reduced with lithium aluminum hydride to give 3-benzyl-9-propoxy-1,2,3,4,5,6-hexahydroazepino[4,5-b]indole.

In the manner given in Preparation 22, other 3-benzyl-substituted 1,2,3,4,5,6 - hexahydroazepino[4,5-b]indoles are obtained by reducing 3-benzoyl-substituted 1,2,3,4,5,6-hexahydroazepino[4,5-b]indoles with a metal hydride such as lithium aluminum hydride. Representative compounds thus obtained include:

3-benzyl-8-ethyl-1,2,3,4,5,6-hexahydroazepino[4,5-b]indole;
3-benzyl-10-ethyl-1,2,3,4,5,6-hexahydroazepino[4,5-b]indole;
3-benzyl-7-ethyl-1,2,3,4,5,6-hexahydroazepino[4,5-b]indole;
3-benzyl-9-propyl-1,2,3,4,5,6-hexahydroazepino[4,5-b]indole;
3-benzyl-7-propyl-1,2,3,4,5,6-hexahydroazepino[4,5-b]indole;
3-benzyl-8-propyl-1,2,3,4,5,6-hexahydroazepino[4,5-b]indole;
3-benzyl-10-propyl-1,2,3,4,5,6-hexahydroazepino[4,5-b]indole;
3-benzyl-9-isopropyl-1,2,3,4,5,6-hexahydroazepino[4,5-b]indole;
3-benzyl-7-isopropyl-1,2,3,4,5,6-hexahydroazepino[4,5-b]indole;
3-benzyl-9-chloro-1,2,3,4,5,6-hexahydroazepino[4,5-b]indole;
3-benzyl-7-bromo-1,2,3,4,5,6-hexahydroazepino[4,5-b]indole;
3-benzyl-8-fluoro-1,2,3,4,5,6-hexahydroazepino[4,5-b]indole;
3-benzyl-10-fluoro-1,2,3,4,5,6-hexahydroazepino[4,5-b]indole;
3-benzyl-7-ethoxy-1,2,3,4,5,6-hexahydroazepino[4,5-b]indole;
3-benzyl-8-ethoxy-1,2,3,4,5,6-hexahydroazepino[4,5-b]indole;
3-benzyl-10-ethoxy-1,2,3,4,5,6-hexahydroazepino[4,5-b]indole;
3-benzyl-9-isopropoxy-1,2,3,4,5,6-hexadroazepino[4,5-b]indole;
3-benzyl-8,9-dichloro-1,2,3,4,5,6-hexadroazepino[4,5-b]indole;
3-benzyl-9,10-dichloro-1,2,3,4,5,6-hexahydroazepino[4,5-b]indole;
3-benzyl-7,8-difluoro-1,2,3,4,5,6-hexahydroazepino[4,5-b]indole;
3-benzyl-7,8-dibromo-1,2,3,4,5,6-hexahydroazepino[4,5-b]indole;
3-benzyl-8,9-dimethyl-1,2,3,4,5,6-hexadroazepino[4,5-b]indole;
3-benzyl-9,10-dimethyl-1,2,3,4,5,6-hexahydroazepino[4,5-b]indole;
3-benzyl-7,8-dimethyl-1,2,3,4,5,6-hexahydroazepino[4,5-b]indole;
3-benzyl-7,8-diethoxy-1,2,3,4,5,6-hexahydroazepino[4,5-b]indole;
3-benzyl-7-ethoxy-8-fluoro-1,2,3,4,5,6-hexahydroazepino[4,5-b]indole;
3-benzyl-7-bromo-9-propoxy-1,2,3,4,5,6-hexahydroazepino[4,5-b]indole;
3-benzyl-7-methyl-9-chloro-1,2,3,4,5,6-hexahydroazepino[4,5-b]indole;
3-benzyl-8,9-dimethoxy-1,2,3,4,5,6-hexahydroazepino[4,5-b]indole;
3-benzyl-8,10-dimethoxy-1,2,3,4,5,6-hexahydroazepino[4,5-b]indole;
and the like.

PREPARATION 33

*1,2,3,4,5,6-hexahydroazepino[4,5-b]indole*

A solution of 3-benzyl-1,2,3,4,5,6-hexahydroazepino[4,5-b]indole (1 g.; 3.61 mmoles) in 150 ml. of ethanol was treated with 100 ml. of 10% palladium-on-carbon catalyst and hydrogenolyzed in a Parr apparatus at an initial pressure of 50 pounds p.s.i. of hydrogen. After 1.5 hours the reaction was completed and the catalyst removed by filtration. The filtrate was concentrated in vacuo to give a residue which was dissolved in 100 ml. of benzene and the solution was concentrated to give solid 1,2,3,4,5,6-hexahydroazepino[4,5-b]indole.

PREPARATION 34

*9-methoxy-1,2,3,4,5,6-hexahydroazepino[4,5-b]-indole*

A solution of 3-benzyl-9-methoxy-1,2,3,4,5,6-hexahydroazepino[4,5-b]indole (5.21 g.; 0.017 mole) in a mixture of 47 ml. of acetic acid and 100 ml. of 95% ethanol was treated with 10% palladium-on-carbon catalyst (1 g.) and the mixture hydrogenolyzed at an initial pressure of 40 p.s.i. in a Parr apparatus during 2 hours. The reaction mixture was then filtered through Celite (diatomaceous earth) and the filtrate concentrated under reduced pressure to give a residue. The residue was dissolved in water, cooled in an ice bath and made alkaline with sodium hydroxide solution. The crystalline solid which was thus obtained was collected by filtration, washed with water and dried in vacuo to yield 3.53 g. of 9-methoxy-1,2,3,4,5,6 - hexahydroazepino[4,5 - b]indole of melting point 174–176° C.

PREPARATION 35

*8-methoxy-1,2,3,4,5,6-hexahydroazepino[4,5-b]-indole*

A mixture of 6.34 g. (0.0207 mole) of 3-benzyl-8-methoxy-1,2,3,4,5,6-hexahydroazepino[4,5-b]indole, 95% ethanol (200 ml.), and 1 g. of 10% palladium-on-carbon catalyst was hydrogenolyzed at an initial pressure of 39.5 p.s.i. for for 8 hours. The resulting mixture was filtered through Celite (diatomaceous earth) and the filtrate was concentrated in vacuo to give a residue. This residue was crystallized from methanol-ethyl acetate to give 3.24 g. (72.4%) of 8 - methoxyl-1,2,3,4,5,6-hexahydroazepino-[4,5-b]indole of melting point 158–160.5° C.

PREPARATION 36

*10-methoxy-1,2,3,4,5,6-hexahydroazepino[4,5-b]-indole*

A mixture of 3-benzyl-10-methoxyl-1,2,3,4,5,6-hexahydroazepino[4,5-b]indole (1.66 g.; 5.42 mmoles), 200 ml. of 95% ethanol, and 0.5 g. of 10% palladium-on-carbon catalyst was hydrogenolyzed at an initial pressure of 41 p.s.i. over a period of 7 hours. The catalyst was removed by filtration through Celite (diatomaceous earth) and the filtrate was concentrated under reduced pressure to give 10-methoxy-1,2,3,4,5,6-hexahydroazepino[4,5-b]indole as an oil.

PREPARATION 37

*7-methoxy-1,2,3,4,5,6-hexahydroazepino[4,5-b]-indole*

A mixture of 1.61 g. (4.70 mmoles) of 3-benzyl-7-methoxy - 1,2,3,4,5,6-hexahydroazepino[4,5-b]indole hydrochloride, 100 ml. of 95% ethanol, and 200 mg. of 10% palladium-on-carbon catalyst was hydrogenolyzed for a period of 2.75 hours at an initial pressure of 38 p.s.i. The resulting mixture was filtered and the filtrate was concentrated under reduced pressure to give a residue which was crystallized from methanol to give 0.782 g. of material of melting point 275–277° C. and 0.233 g. of material of melting point 278–279° C. (85.4% yield). This material was recrystallized from methanol to give 7-methoxy - 1,2,3,4,5,6-hexahydroazepino[4,5-b]indole hydrochloride of melting point 275–275.5° C.

*Analysis.*—Calc'd for $C_{13}H_{17}ClN_2O$ (percent): C, 61.77 H, 6.78; N, 11.09; Cl, 14.03. Found (percent): C, 61.83; H, 6.71; N, 10.92; Cl, 13.85.

Treatment of the hydrochloride with aqueous sodium hydroxide solution yielded 7-methoxy-1,2,3,4,5,6-hexahydroazepino[4,5-b]indole.

PREPARATION 38

*9-fluoro-1,2,3,4,5,6-hexahydroazepino[4,5-b]indole*

A mixture of 5.58 g. (0.0190 mole) of 3-benzyl-9-fluoro-1,2,3,4,5,6-hexahydroazepino[4,5-b]indole, 250 ml. of 95% ethanol, and 1 g. of 10% palladium-on-carbon catalyst was hydrogenolyzed in a Parr apparatus for 170 minutes at an initial pressure of 29 p.s.i. The reaction mixture was then filtered through Celite (diatomaceous earth) and the filtrate concentrated in vacuo to give a crystalline residue which was recrystallized from ethyl acetate to give 3.36 g. (86.7%) of 9-fluoro-1,2,3,4,5,6-hexahydroazepino-[4,5-b]indole, while after additional recrystallization from ethyl acetate, had a melting point of 179–180° C.

*Analysis.*—Calc'd. for $C_{12}H_{13}N_2F$ (percent): C, 70.56; H, 6.41; N, 13.72; F, 9.30. Found (percent): C, 70.70; H, 6.09; N, 13.60; F, 9.09.

PREPARATION 39

*7-methyl-1,2,3,4,5,6-hexahydroazepino[4,5-b]-indole*

A mixture of 4.84 g. (0.0148 mole) of 3-benzyl-7-methyl-1,2,3,4,5,6-hexahydroazepino[4,5-b]indole hydrochloride, 200 ml. of 95% ethanol, and 1 g. of 10% palladium-on-carbon catalyst was hydrogenolyzed for a period of 2.5 hours at an initial pressure of 41 p.s.i. The catalyst was removed by filtration through Celite (diatomaceous earth) and the filtrate was concentrated under reduced pressure to yield a crystalline residue. This crystalline residue was recrystallized from methanol to give a total of 2.64 g. (75.0%) of 7-methyl-1,2,3,4,5,6-hexahydroazepino[4,5-b]indole hydrochloride which after an additional recrystallization from methanol melted at 271° C. (dec.).

*Analysis.*—Calc'd for $C_{13}H_{17}N_2Cl$ (percent): C, 65.95; H, 7.24; N, 11.84; Cl, 14.98. Found (percent): C, 65.93; H, 7.26; N, 11.53; Cl, 14.90.

Treatment of the hydrochloride with aqueous sodium hydroxide solution yield 7-methyl-1,2,3,4,5,6-hexahydroazepino[4,5-b]indole.

PREPARATION 40

*9-methyl-1,2,3,4,5,6-hexahydroazepino[4,5-b]indole*

A solution of 7.89 g. (0.0272 mole) of 3-benzyl-9-methyl-1,2,3,4,5,6-hexahydroazepino[4,5-b]indole in 200 ml. of 95% ethanol and 10 ml. of glacial acetic acid was treated with 1 g. of 10% palladium-on-carbon catalyst and hydrogenolyzed at an initial pressure of 30 p.s.i. during a period of 1.5 hours. The reaction mixture was then filtered through Celite (diatomaceous earth) and the filtrate was concentrated in vacuo to give a residue. A solution of this residue in water was decolorized with active charcoal (Darco G60). The solution was cooled in an ice bath and made alkaline with sodium hydroxide. The resulting crystalline product was collected by filtration, washed with water and dried in vacuo to give 5.18 g. (95.2%) of 9-methyl-1,2,3,4,5,6-hexahydroazepino-[4,5-b]indole which after recrystallization from methylene chloride-methanol had a melting point of 243.5–245° C. (dec.).

*Analysis.*—Calc'd. for $C_{13}H_{16}N_2$ (percent): C, 77.96; H, 8.05; N, 13.99. Found (percent): C, 77.76; H, 8.38; N, 13.93.

PREPARATION 41

*7-chloro-1,2,3,4,5,6-hexahydroazepino[4,5-b]indole*

In the manner given in Preparation 33, 3-benzyl-7-chloro - 1,2,3,4,5,6 - hexahydroazepino[4,5 - b]indole was hydrogenolyzed in the presence of a palladium-on-charcoal catalyst to give 7-chloro-1,2,3,4,5,6-hexahydroazepino[4,5-b]indole.

PREPARATION 42

*9-ethyl-1,2,3,4,5,6-hexahydroazepino[4,5-b]indole*

In the manner given in Preparation 33, 3-benzyl-9-ethyl-1,2,3,4,5,6-hexahydroazepino[4,5-b]indole was hydrogenolyzed in the presence of a palladium-on-charcoal catalyst to give 9-ethyl-1,2,3,4,5,6-hexahydroazepino[4,5-b]indole.

PREPARATION 43

*9-propoxy-1,2,3,4,5,6-hexahydroazepino[4,5-b]indole*

In the manner given in Preparation 33, 3-benzyl-9-propoxyl-1,2,3,4,5,6 - hexahydroazepino[4,5-b]indole was hydrogenolyzed in the presence of a palladium-on-charcoal catalyst to give 9-propoxy-1,2,3,4,5,6-hexahydroazepino[4,5-b]indole.

In the manner given in Preparation 33, other substituted 1,2,3,4,5,6-hexahydroazepino[4,5-b]indoles are prepared from 3-benzyl-substituted 1,2,3,4,5,6-hexahydroazepino[4,5-b]indoles by hydrogenolysis in the presence of a noble metal catalyst, preferably palladium on a carrier. Representative compounds thus prepared include:

8-ethyl-1,2,3,4,5,6-hexahydroazepino[4,5-b]indole;
10-ethyl-1,2,3,4,5,6-hexahydroazepino[4,5-b]indole;
7-ethyl-1,2,3,4,5,6-hexahydroazepino[4,5-b]indole;
9-propyl-1,2,3,4,5,6-hexahydroazepino[4,5-b]indole;
7-propyl-1,2,3,4,5,6-hexahydroazepino[4,5-b]indole;
8-propyl-1,2,3,4,5,6-hexahydroazepino[4,5-b]indole;
10-propyl-1,2,3,4,5,6-hexahydroazepino[4,5-b]indole;
9-isopropyl-1,2,3,4,5,6-hexahydroazepino[4,5-b]indole;
7-isopropyl-1,2,3,4,5,6-hexahydroazepino[4,5-b]indole;
9-chloro-1,2,3,4,5,6-hexahydroazepino[4,5-b]indole;
7-bromo-1,2,3,4,5,6-hexahydroazepino[4,5-b]indole;
8-fluoro-1,2,3,4,5,6-hexahydroazepino[4,5-b]indole;
10-fluoro-1,2,3,4,5,6-hexahydroazepino[4,5-b]indole;
7-ethoxy-1,2,3,4,5,6-hexahydroazepino[4,5-b]indole;
8-ethoxy-1,2,3,4,5,6-hexahydroazepino[4,5-b]indole;
10-ethoxy-1,2,3,4,5,6-hexahydroazepino[4,5-b]indole;
9-isopropoxy-1,2,3,4,5,6-hexahydroazepino[4,5-b]indole;
8,9-dichloro-1,2,3,4,5,6-hexahydroazepino[4,5-b]indole;
9,10-dichloro-1,2,3,4,5,6-hexahydroazepino[4,5-b]indole;
7,8-difluoro-1,2,3,4,5,6-hexahydroazepino[4,5-b]indole;
7,8-dibromo-1,2,3,4,5,6-hexahydroazepino[4,5-b]indole;
8,9-dimethyl-1,2,3,4,5,6-hexahydroazepino[4,5-b]indole;
9,10-dimethyl-1,2,3,4,5,6-hexahydroazepino[4,5-b]indole;
7,8-dimethyl-1,2,3,4,5,6-hexahydroazepino[4,5-b]indole;
7,8-diethoxy-1,2,3,4,5,6-hexahydroazepino[4,5-b]indole;
7-ethoxy-8-fluoro-1,2,3,4,5,6-hexahydroazepino [4,5-b]indole;
7-bromo-9-propoxy-1,2,3,4,5,6-hexahydroazepino [4,5-b]indole;
7-methyl-9-chloro-1,2,3,4,5,6-hexahydroazepino [4,5-b]indole;
8,9-dimethoxy-1,2,3,4,5,6-hexahydroazepino [4,5-b]indole;
8,10-dimethoxy-1,2,3,4,5,6-hexahydroazepino [4,5-b]indole;
and the like.

PREPARATION 44

6-methyl-1,2,3,4,5,6-hexahydroazepino[4,5-b]indole

To an ice-cold, stirred solution of 1,2,3,4,5,6-hexahydroazepino[4,5-b]indole (3.73 g. 0.02 mole) in 200 ml. of dry dimethylformamide was added in a nitrogen atmosphere, 0.960 g. of a 55% suspension of sodium hydride in mineral oil (0.022 mole of sodium hydride). This mixture was allowed to warm to 25° C. and stand for 2 hours. It was then cooled in an ice bath and treated during 30 minutes with a solution of methyl iodide (1.37 ml.; 0.022 mole) in 25 ml. of ether. The resulting solution was allowed to stand for 18 hours at 25° C. It was then concentrated under reduced pressure to about 50 ml. and poured into water. The mixture was extracted four times with ether, the ether extracts combined, washed with brine, dried over anhydrous potassium carbonate and concentrated under reduced pressure to give 6-methyl-1,2,3,4,5,6-hexahydroazepino[4,5-b]indole.

PREPARATION 45

6-ethyl-1,2,3,4,5,6-hexahydroazepino[4,5-b]indole

A cold solution of 7.45 g. of 1,2,3,4,5,6-hexahydroazepino[4,5-b]indole in 400 ml. of dry dimethylformamide in a nitrogen atmosphere was treated with 1.92 g. of a 55% suspension of sodium hydride in mineral oil. The mixture was stirred at room temperature for 3 hours, then cooled and treated with a solution of 3.54 ml. of ethyl iodide in 50 ml. of ether. The addition took place over a period of 15 minutes. The mixture was then allowed to stir at room temperature for about 18 hours. The mixture was thereupon concentrated under reduced pressure to give a residue which was dissolved in 250 ml. of water. The aqueous mixture was extracted three times with ether and three times with methylene chloride. The two extracts were worked separately, that is, washed with brine, then water and finally dried over anhydrous potassium carbonate. Thereafter, the two extracts were combined and concentrated to give a residue which was suspended on 30 g. of silica gel and chromatographed over 450 g. of silica gel using 2% diethylamine-48% methanol-50% ethyl acetate (all volume percent) for elution. Fractions of about 150 ml. were collected. The first band (A) consisted of fractions 6–9. The product was found in fractions 14–21 (band B). The B fractions were combined and concentrated under reduced pressure to give a residue which was dissolved in ethyl acetate, cooled and acidified with methanolic hydrogen chloride. The precipitate which resulted was collected by filtration, washed with ethyl acetate and dried in vacuo to yield 7.67 g. of material which was recrystallized from ethanol and then three times from methanol-ethyl acetate to give 6-ethyl-1,2,3,4,5,6-hexahydroazepino[4,5-b]indole hydrochloride of melting point 253–254° C. (dec.).

Analysis.—Calc'd for $C_{14}H_{19}N_2Cl$ (percent): C, 67.05; H, 7.64; N, 11.17; Cl, 14.14. Found (percent): C, 67.10; H, 7.90; N, 11.47; Cl, 14.38.

Treatment of the hydrochloride with aqueous sodium hydroxide solution yielded 6-ethyl-1,2,3,4,5,6-hexahydroazepino[4,5-b]-indole.

PREPARATION 46

6-methyl-9-methoxy-1,2,3,4,5,6-hexahydroazepino [4,5-b]indole

In the manner shown in Preparation 44, 9-methoxy-1,2,3,4,5,6-hexahydroazepino[4,5-b]indole was treated with sodium hydride and then with methyl iodide to give a mixture of amines. This mixture was separated by chromatography over silica gel using as eluant a mixture of 2% diethylamine - 15% methanol - 83% ethyl acetate. Fractions 14–24 contained 3,6-dimethyl-9-methoxy-1,2,3,4,5,6-hexahydroazepino[4,5-b]indole.

Fractions 28–49 from the chromatographic column contained 6 - methyl-9-methoxy-1,2,3,4,5,6-hexahydroazepino [4,5-b]indole which was converted to its hydrochloride with methanolic hydrogen chloride. Crystallization of this salt from methanol gave 6-methyl-9-methoxy-1,2,3,4,5,6-hexahydroazepino[4,5-b]indole hydrochloride having a melting point of 272° C. (dec.).

Analysis.—Calc'd for $C_{14}H_{19}ClN_2O$ (percent): C, 63.03; H, 7.18; N, 10.50; Cl, 13.29. Found (percent): C, 62.89; H, 7.25; N, 10.36; Cl, 13.25.

Treatment of the hydrochloride with aqueous sodium hydroxide solution yielded 6-methyl-9-methoxy-1,2,3,4,5,6-hexahydroazepino[4,5-b]indole.

PREPARATION 47

6-propyl-9-fluoro-1,2,3,4,5,6-hexahydroazepino [4,5-b]indole

In the manner given in Preparation 44, 9-fluoro-1,2,3,4,5,6-hexahydroazepino[4,5-b]indole was treated in sequence with sodium hydride and then propyl iodide to give 6 - propyl - 9-fluoro-12,3,4,5,6-hexahydroazepino[4,5-b] indole.

PREPARATION 48

6-isoproyl-9-methyl-1,2,3,4,5,6-hexahydroazepino [4,5-b]indole

In the manner given in Preparation 44, 9-methyl-1,2,3,4,5,6 - hexahydroazepino[4,5-b]indole in dimethylformamide was treated in sequence with sodium hydride and then with isopropyl iodide to give 6-isopropyl-9-methyl-1,2,3,4,5,6-hexahydroazepino[4,5-b]indole.

EXAMPLE 1

4-fluoro-4-(1,4,5,6-tetrahydroazepino[4,5-b]indol-3(2H)-yl)butyrophenone

A mixture of 1,2,3,4,5,6-hexahydroazepino[4,5-b]indol (18.6 g.; 0.10 mole) 28 g. (0.14 mole) of 4-chloro-4'-fluorobutyrophenone, 32 g. of anhydrous sodium carbonate, 1150 ml. of freshly distilled 4-methyl-2-pentanone and a few crystals of potassium iodide was refluxed under continuous stirring in a nitrogen atmosphere for a period of 15 hours. The mixture was cooled, poured into 1.5 l. of water and twice extracted with ether. The ether extracts were combined, dried over anhydrous potassium carbonate and concentrated under reduced pressure. The residual oil was treated successively with toluene and benzene with concentration after each addition. The residue was dissolved in methylene chloride and treated with 108 g. of silica gel and then concentrated to dryness under reduced pressure. The resulting free-flowing solid was poured onto a column of silica gel which had been treated with 2% diethylamine-98% ethyl acetate. The column was eluted with 2% diethylamine-98% ethyl acetate; 200-ml. fractions were collected. Fractions 55–82 contained the desired product: 13.3 g. (38%). The product was recrystallized from diethyl ether to give an analytically pure sample of 4' - fluoro-4-(1,4,5,6-tetrahydroazepino[4,5-b]indol-3(2H)-yl)butyrophenone of M.P. 101.5–102.5° C.

*Analysis.*—Calc'd for $C_{22}H_{23}FN_2O$ (percent): C, 75.40; H; 6.61; N, 8.00; F, 5.42. Found (percent): C, 75.09; H, 6.89; N, 8.12; F, 5.36.

EXAMPLE 2

4'-fluoro-4-(1,4,5,6-tetrahydro-6-methylazepino[4,5-b]indol-3(2H)-yl)butyrophenone and hydrochloride thereof A mixture of 7 g. (0.035 mole) of 6-methyl-1,2,3,4,5,6-hexahydroazepino[4,5-b]indole, 9.84 g. (0.048 mole) of 4-chloro-4'-fluorobutyrophenone, 11.2 g. of anhydrous sodium carbonate, 440 ml. of 4-methyl-2-pentanone and a few crystals of potassium iodide was refluxed for a period of 20 hours in a nitrogen atmosphere. The mixture was then poured into cold water and extracted several times with ether. The ether extracts were combined, washed with brine, dried over anhydrous potassium carbonate and concentrated under reduced pressure. The oily residue was chromatographed on silica gel (700 g.). Elution of the silica gel column with 2% triethylamine-98% ethyl acetate eliminated two unknown by-products. Further elution with 2% triethylamine-5% methanol-93% ethyl acetate gave the fractions containing the desired product. A solution of this product in ethyl acetate was acidified with methanolic hydrogen chloride. Crystallization of the resulting salt from methanol-ethyl acetate gave 6.84 g. of product melting at 224–226° C. and 0.37 g. of product melting at 220–223° C., a total of 51.4% crude yield of 4' - fluoro - 4-(1,4,5,6-tetrahydro-6-methylazepino[4,5-b]indol-3(2H)-yl)butyrophenone hydrochloride. Recrystallization of the product from methanol-ethyl acetate two times gave pure 4'-fluoro-4-(1,4,5,6-tetrahydro-6-methylazepino[4,5 - b]indol - 3(2H)-yl)butyrophenone hydrochloride of M.P. 223–224°.

*Analysis.*—Calc'd for $C_{23}H_{26}ClFN_2O$ (percent): C, 68.90; H, 6.54; Cl, 8.84; F, 4.74; N, 6.99. Found (percent): C, 68.73; H, 6.37; Cl, 8.83; F, 4.52; N, 7.38.

Treatment of the hydrochloride with aqueous sodium hydroxide solution yielded 4'-fluoro-4-(1,4,5,6-tetrahydro-6-methylazepino[4,5-b]indol-3(2H)-yl)butyrophenone.

EXAMPLE 3

4' - fluoro - 4 - (1,4,5,6 - tetrahydro - 10 - methoxyazepino[4,5-b]indol-3(2H)-yl)butyrophenone and hydrochloride thereof A stirred mixture of 10-methoxy-1,2,3,4,5,6-hexahydroazepinoindole (4.32 g.; 0.020 mole), 5.62 g. of 4-chloro-4'-fluorobutyrophenone, 6.42 g. of sodium carbonate, 250 ml. of 4-methyl-2-pentanone and a few crystals of potassium iodide was refluxed for 18 hours in a nitrogen atmosphere. The mixture was then cooled and poured into ice water. The mixture was extracted twice with ether, the ether extracts combined, washed with brine, dried over anhydrous potassium carbonate and concentrated in vacuo. The resulting residue was dissolved in a small amount of toluene and concentrated to remove the last traces of 4-methyl-2-pentanone. The resulting oil was chromatographed over 350 g. of silica gel with 2% triethylamine-2.5% methanol-95.5% ethyl acetate. Fractions of 100 ml. of each were collected. Fractions 12 to 26 contained the desired product; these fractions were combined, acidified with methanolic hydrogen chloride and crystallized from ethanol to give 4.35 g. of product of M.P. 212–214° C. and 0.68 g. of product of M.P. 215–215.5° C., a yield of 60.3%. This material was recrystallized from 95% ethanol to give pure 4'-fluoro-4-(1,4,5,6-tetrahydro-10-methoxyazepino[4,5-b]indol-3(2H) - yl)butyrophenone hydrochloride of M.P. 214.5–215.5° C.

*Analysis.*—Calc'd for $C_{23}H_{26}ClFN_2O_2$ (percent): C, 66.25; H, 6.29; Cl, 8.51; F, 4.56; N, 6.72. Found (percent): C, 66.29; H, 6.15; Cl, 8.22; F, 4.66; N, 6.87.

Treatment of the hydrochloride with aqueous sodium hydroxide solution yield 4'-fluoro-4-(1,4,5,6-tetrahydro-10 - methoxyazepino[4,5-b]indol - 3(2H) - yl)butyrophenone.

EXAMPLE 4

4' - fluoro - 4-(1,4,5,6 - tetrahydro - 9 - methoxyazepino[4,5-b]indol-3(2H)-yl)butyrophenone and cyclohexanesulfamate thereof A mixture was prepared containing 4.15 g. (0.0192 mole) of 9-methoxy-1,2,3,4,5,6-hexahydroazepino[4,5-b]indole, 5.38 g. of 4-chloro-4'-fluorobutyrophenone, 6.16 g. of anhydrous sodium carbonate, 240 ml. of 4-methyl-2-pentanone and a few crystals of potassium iodide. This mixture was refluxed for a period of 24 hours with continuous stirring in a nitrogen atmosphere, then cooled and poured into cold water. The mixture was then extracted twice with ether, the ether extracts were combined, washed with brine, dried over anhydrous potassium carbonate and concentrated in vacuo. The resulting residue was dissolved in a small amount of toluene and concentrated to remove last traces of 4-methyl-2-pentanone. The resulting material was chromatographed over 350 g. of silica gel with 2% triethylamine-2.5% methanol-95.5% ethyl acetate. Fractions of 100 ml. each were collected. The desired product was found in fractions 13–25, which fractions were combined and treated with cyclohexanesulfamic acid (2.0 g.). The resulting salt was collected and crystallized from methanol to give 4.81 g. of material melting at 150.5–154° C., 1.65 g. of material melting at 150–152° C. and 0.254 g. of material melting at 148–151.5° C., a total of 62.4% yield. The thus-obtained crude product was recrystallized from methanol-ethyl acetate to give 4'-fluoro-4-(1,4,5,6-tetrahydro-9-methoxyazepino[4,5-b]indol-3(2H)-yl) - butyrophenone cyclohexanesulfamate melting at 171.5–172.5° C. (dec.).

*Analysis.*—Calcd for $C_{29}H_{38}FN_3O_5S$ (percent): C, 62.12; H, 7.01; F, 3.39; N, 7.49; S, 5.72. Found (percent): C, 62.29; H, 6.91; F, 3.62; N, 7.52; S, 5.79.

Treatment of the cyclohexanesulfamate with aqueous sodium hydroxide solution yielded 4'-fluoro-4-(1,4,5,6-tetrahydro-9-methoxyazepino[4,5-b]indol-3(2H) - yl)butyrophenone.

EXAMPLE 5

4'-fluoro-4-(1,4,5,6-tetrahydro-8-methoxyazepino[4,5-b]indol-3(2H)-yl)butyrophenone A mixture was prepared containing 4.32 g. (0.020 mole) of 8-methoxy-1,2,3,4,5,6-hexahydrazepino[4,5-b]indole, 5.62 g. of 4-chloro-4'-fluorobutyrophenone, 6.42 g. of anhydrous sodium carbonate, 250 ml. of 4-methyl-2-pentanone and a few crystals of potassium iodide. This mixture was refluxed under continuous stirring in a nitrogen atmosphere for a period of 18 hours, then cooled and poured into ice water. The thus-obtained mixture was extracted twice with ether, the ether extracts were combined, washed with brine, dried over anhydrous potassium carbonate and concentrated under reduced pressure to give a residue. This residue was dissolved in a small amount of toluene and concentrated to remove last traces of 4-methyl-2-pentanone. Crystallization of the resulting material from ethyl acetate-Skellysolve B gave 2.60 g. of the product, 4'-fluoro-4-(1,4,5,6-tetrahydro-8-methoxyazepino[4,5-b]indol - 3(2H) - yl)butyrophenone of M.P. 136.5–138° C. Additional product was obtained by concentrating and chromatographing the mother liquor over 300 g. of silica gel, using 2% triethylamine-2.5% methanol-95.5% ethyl acetate and collecting 100-ml. fractions. Fractions 20–34 gave 1.16 g. of product melting 137–139.5 C. and 0.295 g. of product melting at 136.5–137.5° C.—a total yield of 53.3%. The products were recrystallized from ethyl acetate-Skellysolve B to give pure 4'-fluoro-4-(1,4,5,6-tetrahydro-8-methoxyazepino[4,5-b]indol - 3(2H) - yl)butyrophenone melting at 137.5–138.5° C.

Analysis.—Calc'd for $C_{23}H_{25}FN_2O_2$ (percent): C, 72.61; H, 6.62; F, 4.99; N, 7.36. Found (percent): C, 72.66; H, 6.73; F, 5.03; N, 7.53.

Example 6

*4'-fluoro-4-(1,4,5,6-tetrahydro-9-methylazepino [4,5-b]indol-3(2H)-yl)butyrophenone*

A mixture was prepared of 4 g. of 9-methyl-1,2,3,4,5,6-hexahydroazepino[4,5-b]indole, 5.62 g. of 4 - chloro-4'-fluorobutyrophenone, 6.42 g. of anhydrous sodium carbonate, 250 ml. of 4 - methyl - 2 - pentanone and a few crystals of potassium iodide. This mixture was refluxed under continuous stirring in a nitrogen atmosphere for a period of 18 hours, then cooled and poured into ice water. The mixture was extracted twice with ether, the ether extracts were combined, washed with brine, dried over anhydrous potassium carbonate and concentrated under reduced pressure to give a residue. This residue was dissolved in toluene and concentrated to remove last traces of 4 - methyl - 2 - pentanone. The resulting semi-crystalline residue was crystallized from methanol-ethyl acetate to give 0.345 g. of unchanged starting 9 - methyl-1,2,3,4,5,6 - hexahydroazepino[4,5 - b]indole. The mother liquor was concentrated and chromatographed over 350 g. of silica gel with 2% triethylamine-98% ethyl acetate; 100-ml. fractions were collected. In fractions 19–40 the desired product was found which was crystallized from ethyl acetate-Skellysolve B to give 3.21 g. melting at 102–103.5° C. and 0.679 g. melting at 103.5–106.5° C., a total of 53.3% yield. An analytical sample was prepared by recrystallization of product material from ethyl acetate-Skellysolve B to give pure 4' - fluoro - 4 - (1,4,5,6-tetrahydro - 9 - methylazepino[4,5-b]indol - 3(2H) - yl)-butyrophenone of melting point 103–104° C.

Analysis.—Calc'd for $C_{23}H_{25}FN_2O$ (percent): C, 75.79; H, 6.91; F, 5.21; N, 7.69. Found (percent): C, 76.12; H, 6.94; F, 5.42; N, 7.38.

Example 7

*4'-methoxy-4-(1,4,5,6-tetrahydro-9-fluoroazepino- [4,5-b]indol-3(2H)-yl)butyrophenone*

In the manner given in Example 1, a mixture of 9-fluoro - 1,2,3,4,5,6 - hexahydroazepino[4,5-b]indole, 4-chloro - 4' - methoxybutyrophenone, anhydrous sodium carbonate, freshly distilled 4 - methyl - 2 - pentanone and a few crystals of potassium iodide was refluxed for fifteen hours to give 4' - methoxy - 4 - (1,4,5,6 - tetrahydro - 9 - fluoroazepino[4,5-b]indol - 3(2H) - yl)butyrophenone.

Example 8

*4'-ethoxy-4-(1,4,5,6-tetrahydro-9-methoxyazepino- [4,5-b]indol-3(2H)-yl)butyrophenone*

In the manner given in Example 1, a mixture of 9-methoxy - 1,2,3,4,5,6 - hexahydroazepino[4,5 - b]indole, 4 - chloro - 4' - ethoxybutyrophenone, anhydrous sodium carbonate, freshly distilled 4 - methyl - 2 - pentanone and a few crystals of potassium iodide was refluxed for fifteen hours to give 4' - ethoxy - 4 - (1,4,5,6 - tetrahydro-9-methoxyazepino[4,5 - b]indol - 3(2H) - yl)butyrophenone.

Example 9

*4'-fluoro-4-(1,4,5,6,-tetrahydro-7-methoxyazepino- [4,5-b]indol-3(2H)-yl)butyrophenone*

In the manner given in Example 1, a mixture of 7-methoxy - 1,2,3,4,5,6 - hexahydroazepino[4,5 - b]indole, 4 - chloro - 4' - fluorobutyrophenone, anhydrous sodium carbonate, freshly distilled 4 - methyl - 2 - pentanone and a few crystals of potassium iodide was refluxed for fifteen hours to give 4' - fluoro - 4 - (1,4,5,6 - tetrahydro-7-methoxyazepino[4,5 - b]indol - 3(2H) - yl)butyrophenone.

Example 10

*4'-chloro-4-(1,4,5,6-tetrahydro-10-methoxyazepino- [4,5-b]indol-3(2H)-yl)butyrophenone*

In the manner given in Example 1, a mixture of 10-methoxy - 1,2,3,4,5,6 - hexahydroazepino[4,5 - b]indole, 4,4' - dichlorobutyrophenone, anhydrous sodium carbonate, freshly distilled 4 - methyl - 2 - pentanone and a few crystals of potassium iodide was refluxed for fifteen hours to give 4' - chloro - 4 - (1,4,5,6 - tetrahydro - 10-methoxyazepino[4,5-b]indol-3(2H)-yl)butyrophenone.

Example 11

*4'-propyl-4-(1,4,5,6-tetrahydro-7-methoxyazepino- [4,5-b]indol-3(2H)-yl)butyrophenone*

In the manner given in Example 1, a mixture of 7-methoxy - 1,2,3,4,5,6 - hexahydroazepino[4,5 - b]indole, 4 - chloro - 4' - propylbutyrophenone, anhydrous sodium carbonate, freshly distilled 4 - methyl - 2 - pentanone and a few crystals of potassium iodide was refluxed for fifteen hours to give 4' - propyl - 4 - (1,4,5,6 - tetrahydro-7-methoxyazepino[4,5-b]indol-3(2H)-yl)butyrophenone.

Example 12

*2'-bromo-4-(1,4,5,6-tetrahydro-7-methylazepino- [4,5-b]indol-3(2H)-yl)butyrophenone*

In the manner given in Example 1, a mixture of 7-methyl - 1,2,3,4,5,6 - hexahydroazepino[4,5-b]indole, 4-chloro - 2' - bromobutyrophenone, anhydrous sodium carbonate, freshly distilled 4 - methyl - 2 - pentanone and a few crystals of potassium iodide was refluxed for fifteen hours to give 2' - bromo - 4 - (1,4,5,6 - tetrahydro-7-methylazepino[4,5-b]indol-3(2H)-yl)butyrophenone.

Example 13

*3'-bromo-4-(1,4,5,6-tetrahydro-9-methylazepino- [4,5-b]indol-3-(2H)-yl)butyrophenone*

In the manner given in Example 1, a mixture of 9-methyl - 1,2,3,4,5,6 - hexahydroazepino[4,5 - b]indole, 4 - chloro - 3' - bromobutyrophenone, anhydrous sodium carbonate, freshly distilled 4 - methyl - 2 - pentanone and a few crystals of potassium iodide was refluxed for fifteen hours to give 3' - bromo - 4 - (1,4,5,6 - tetrahydro-9-methylazepino[4,5-b]indol-3(2H)-yl)butyrophenone.

Example 14

*3'-fluoro-4-(1,4,5,6-tetrahydro-7-chloroazepino- [4,5-b]indol-3(2H)-yl)butyrophenone*

In the manner given in Example 1, a mixture of 7-chloro - 1,2,3,4,5,6 - hexahydroazepino[4,5 - b]indole, 4 - chloro - 3' - fluorobutyrophenone, anhydrous sodium carbonate, freshly distilled 4 - methyl - 2 - pentanone and a few crystals of potassium iodide was refluxed for fifteen hours to give 3' - fluoro - 4 - (1,4,5,6 - tetrahydro-7-chloroazepino[4,5-b]indol-3(2H)-yl)butyrophenone.

EXAMPLE 15

*4'-isopropoxy-4-(1,4,5,6-tetrahydro-9-ethylazepino-[4,5-b]indol-3(2H)-yl)butyrophenone*

In the manner given in Example 1, a mixture of 9-ethyl - 1,2,3,4,5,6 - hexahydroazepino[4,5 - b]indole, 4-chloro - 4' - isopropoxybutyrophenone, anhydrous sodium carbonate, freshly distilled 4 - methyl - 2 - pentanone and a few crystals of potassium iodide was refluxed for fifteen hours to give 4' - ispropoxy - 4 - (1,4,5,6 - tetrahydro-9-ethylazepino[4,5-b]indol-3(2H)-yl)butyrophenone.

EXAMPLE 16

*2'-ethyl-4-(1,4,5,6-tetrahydro-9-propoxyazepino [4,5-b]indol-3(2H)-yl)butyrophenone*

In the manner given in Example 1, a mixture of 9 - propoxy - 1,2,3,4,5,6 - hexahydroazepino[4,5-b]indole, 4-chloro-2'-ethylbutyrophenone, anhydrous sodium carbonate, freshly distilled 4-methyl-2-pentanone and a few crystals of potassium iodide was refluxed for fifteen hours to give 2'-ethyl-4-(1,4,5,6-tetrahydro - 9 - propoxyazepino [4,5-b]indol-3(2H)-yl)butyrophenone.

EXAMPLE 17

*3'-chloro-4-(1,4,5,6-tetrahydro-6-methylazepino [4,5-b]indol-3(2H)-yl)butyrophenone*

In the manner given in Example 1, a mixture of 6-methyl-1,2,3,4,5,6-hexahydroazepino[4,5-b]indole, 3',4-dichlorobutyrophenone, anhydrous sodium carbonate, freshly distilled 4-methyl-2-pentanone and a few crystals of potassium iodide was refluxed for fifteen hours to give 3'-chloro-4-(1,4,5,6-tetrahydro - 6 - methylazepino[4,5-b] indol-3(2H)-yl)butyrophenone.

EXAMPLE 18

*3'-propyl-4-(1,4,5,6-tetrahydro-6,9-diethylazepino [4,5-b]indol-3(2H)-yl)butyrophenone*

In the manner given in Example 1, a mixture of 6,9-diethyl - 1,2,3,4,5,6 - hexahydroazepino[4,5-b]indole, 4-chloro-3'-propylbutyrophenone, anhydrous sodium carbonate, freshly distilled 4-methyl-2-pentanone and a few crystals of potassium iodide was refluxed for fifteen hours to give 3'-propyl-4-(1,4,5,6-tetrahydro-6,9-diethylazepino [4,5-b]indol-3(2H)-yl)butyrophenone.

EXAMPLE 19

*4-isopropyl-4-(1,4,5,6-tetrahydro-6-methyl-7-methoxy-azepino[4,5-b]indol-3(2H)-yl)butyrophenone*

In the manner given in Example 1, a mixture of 6 - methyl-7-methoxy-1,2,3,4,5,6-hexahydroazepino[4,5-b] indole, 4 - chloro - 4'-isopropylbutyrophenone, anhydrous sodium carbonate, freshly distilled 4-methyl-2-pentanone and a few crystals of potassium iodide was refluxed for fifteen hours to give 4-isopropyl-4-(1,4,5,6-tetrahydro-6-methyl-7-methoxyazepino[4,5 - b]indol-3(2H)-yl)butyrophenone.

EXAMPLE 20

*2'-methoxy-4-(1,4,5,6-tetrahydro-6-methyl-9-fluoro-azepino[4,5-b]indol-3(2H)-yl)butyrophenone*

In the manner given in Example 1, a mixture of 6-methyl - 9 - fluoro-1,2,3,4,5,6-hexahydroazepino[4,5-b] indole, 4 - chloro - 2' - methoxybutyrophenone, anhydrous sodium carbonate, freshly distilled 4-methyl-2-pentanone and a few crystals of potassium iodide was refluxed for fifteen hours to give 2'-methoxy-4-(1,4,5,6-tetrahydro-6-methyl - 9 - fluoroazepino[4,5 - b]indol-3(2H)-yl)butyrophenone.

In the manner given in Example 1, other Formula III 4 - (1,4,5,6 - tetrahydroazepino[4,5-b]indol - 3(2H) - yl) butyrophenones were prepared by reacting together a selected Formula I 1,2,3,4,5,6-hexahydroazepino[4,5-b] indole, a Formula II 4-halobutyrophenone, anhydrous sodium or potassium carbonate in an inert organic solvent, preferably in the presence of potassium iodide in catalytic amounts. Representative products thus obtained include 4-(1,4,5,6-tetrahydroazepino[4,5-b]indol-3-(2H)-yl) butyrophenone;
4'-fluoro-4-(1,4,5,6-tetrahydro-6-propylazepino-[4,5-b] indol-3-(2H)-yl)butyrophenone;
4'-methyl-4-(1,4,5,6-tetrahydro-6,7-diethylazepino [4,5-b]indol-3(2H)-yl)butyrophenone;
2'-fluoro-4-(1,4,5,6-tetrahydro-8-ethylazepino[4,5-b] indol-3-(2H)-yl)butyrophenone;
2'-chloro-4-(1,4,5,6-tetrahydro-10-ethylazepino[4,5-b] indol-3-(2H)-yl)-butyrophenone;
3'-bromo-4-(1,4,5,6-tetrahydro-9-propylazepino[4,5-b] indol-3-(2H)-yl)-butyrophenone;
4'-ethyl-4-(1,4,5,6-tetrahydro-8-propylazepino[4,5-b] indol-3-(2H)-yl)-butyrophenone;
3'-isopropoxy-4-(1,4,5,6-tetrahydro-9-isopropylazepino [4,5-b]indol-3(2H)-yl)butyrophenone;
3'-ethyl-4-(1,4,5,6-tetrahydro-9,10-dimethylazepino [4,5-b]indol-3(2H)-yl)butyrophenone;
2'-propyl-4-(1,4,5,6-tetrahydro-7,8-diethoxyazepino [4,5-b]indol-3(2H)-yl)butyrophenone;
2'-methoxy-4-(1,4,5,6-tetrahydro-7,8-dibromoazepino [4,5-b]indol-3(2H)-yl)butyrophenone;
3'-ethoxy-4-(1,4,5,6-tetrahydro-7-bromo-9-propoxy-azepino[4,5-b]indol-3(2H)-yl)butyrophenone;
4'-chloro-4-(1,4,5,6-tetrahydro-8,9-dichloroazepino [4,5-b]indol-3(2H)-yl)butyrophenone;
4'-fluoro-4-(1,4,5,6-tetrahydro-7-methyl-9-chloroazepino [4,5-b]indol-3(2H)-yl)butyrophenone;
4'-fluoro-4-(1,4,5,6-tetrahydro-8,9-dimethoxyazepino [4,5-b]indol-3(2H)-yl)butyrophenone;
4'-fluoro-4-(1,4,5,6-tetrahydro-8,10-dimethoxyazepino [4,5-b]indol-3(2H)-yl)butyrophenone;

and the like.

Treating such butyrophenones corresponding to Formula III with calculated amounts of organic or inorganic acids, especially pharmaceutically acceptable acids provides the acid addition salts of these products, e.g., the hydrochlorides, hydrobromides, sulfates, phosphates, fluosilicates, thiocyanates, trichloroacetates, acetates, propionates, benzoates, salicylates, lactates, tartrates, citrates cyclohexanesulfamates p-toluenesulfonates, methanesulfonates and the like of the selected 4-(1,4,5,6-tetrahydroazepino- [4,5-b]indol-3(2H)-yl)butyrophenones.

I claim:

1. A 4-(1,4,5,6-tetrahydroazepino[4,5-b]indol-3(2H)-yl)butyrophenone of the formula:

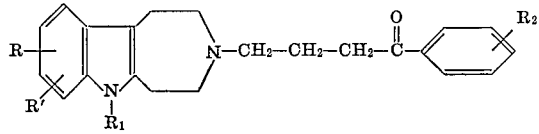

wherein R, R' and $R_2$ are selected from the group consisting of hydrogen, lower-alkyl and lower-alkoxy containing from 1 to 3 carbon atoms, inclusive, fluorine, chlorine and bromine; and wherein $R_1$ is selected from the group consisting of hydrogen and lower-alkyl defined as above, and the pharmaceutically acceptable acid addition salts thereof.

2. A compound according to claim 1, wherein R, R' and $R_1$ are hydrogen, and $R_2$ is 4'-fluoro, so that the compound is 4'-fluoro - 4 - (1,4,5,6-tetrahydroazepino[4,5-b] indol-3(2H)-yl)butyrophenone.

3. A compound according to claim 1, wherein R and R' are hydrogen, $R_1$ is methyl, and $R_2$ is 4'-fluoro, so that the compound is 4′-fluoro-4-(1,4,5,6-tetrahydro-6-methylazepino[4,5-b]indol-3(2H)-yl)butyrophenone.

4. The hydrochloride of the compound according to claim 3, namely, 4′-fluoro-4-(1,4,5,6-tetrahydro-6-methylazepino[4,5-b]indol - 3(2H) - yl)butyrophenone hydrochloride.

5. A compound according to claim 1 wherein R is 10-methoxy R′ and $R_1$ are hydrogen and $R_2$ is 4′-fluoro, so that the compound is 4′-fluoro-4-(1,4,5,6-tetrahydro-10-methoxyazepino[4,5-b]indol-3(2H)-yl)butyrophenone.

6. The hydrochloride of the compound according to claim 5, namely, 4′-fluoro-4-(1,4,5,6-tetrahydro-10-methoxyazepino[4,5 - b]indol-3(2H)-yl)butyrophenone hydrochloride.

7. A compound according to claim 1, wherein R is 9-methoxy, R′ and $R_1$ are hydrogen and $R_2$ is 4′-fluoro, so that the compound is 4′-fluoro-4-(1,4,5,6-tetrahydro-9-methoxyazepino[4,5-b]indol-3(2H)-yl)-butyrophenone.

8. The cyclohexanesulfamate of the compound according to claim 7, namely, 4′-fluoro-4-(1,4,5,6-tetrahydro - 9 - methoxyazepino-[4,5-b]indol-3-(2H)-yl)butyrophenone cyclohexanseulfamate.

9. A compound according to claim 1, wherein R is 8-methoxy, R′ and $R_1$ are hydrogen and $R_2$ is 4′-fluoro, so that the compound is 4′-fluoro-4-(1,4,5,6-tetrahydro-8-methoxyazepino[4,5-b]indol-3(2H)-yl)-butyrophenone.

10. A compound according to claim 1 wherein R is 9-methyl, $R_1$ and R′ are hydrogen and $R_2$ is 4′-fluoro, so that the compound is 4′-fluoro-4-(1,4,5,6-tetrahydro-9-methylazepino[4,5-b]indol-3(2H)-yl)butyrophenone.

References Cited

UNITED STATES PATENTS 3,419,569   12/1968   Renner _____ 260—296

OTHER REFERENCES

Wagner and Zook: Synthetic Organic Chemistry; Wiley and Sons, N.Y., 1953, (pp. 666–670 relied on).

ALEX MAZEL, Primary Examiner

A. M. T. TIGHE, Assistant Examiner

U.S. Cl. X.R.

71—96; 195—12; 252—401; 260—239, 326.9; 424—274

UNITED STATES PATENT OFFICE
CERTIFICATE OF CORRECTION

Patent No. 3,553,232                    Dated    January 5, 1971

Inventor(s)    Jackson B. Hester, Jr.

It is certified that error appears in the above-identified patent and that said Letters Patent are hereby corrected as shown below:

· Column 1, Formulas I, II, and III, should appear as shown below instead of as in the patent:

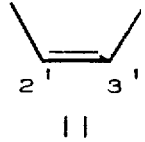

Column 2, line 31, for "are tranquillizers" read -- are active tranquillizers --.
Column 8, line 28, for "6.83%)." read -- 6.82%). --; line 71, for "1,2,3,4,5,5-" read -- 1,2,3,4,5,6- --. Column 9, line 11, for "product" read -- produce --; line for "Skelly-solve" read -- Skellysolve --. Column 13, line 44 for "3-benzyl" read -- benzoyl --; line 52, for "3-benzyl" read benzoyl --. Column 15, line 21, for "for for 8" read -- for 8 line 25, for "methoxyl" read -- methoxy --; line 31, for "methoxyl" read -- methoxy --. Column 16, line 1, for "while" read -- which --; line 26, for "yield" read --yielded --; line for "propoxyl" read --propoxy --. Column 18, line 19, for "ethanol" read -- methanol --; line 64, for "12,3,4,5,6-" read 1,2,3,4,5,6- --. Column 19, line 2, for "4-Fluoro" read -- 4'-Fluoro --. Column 20, line 12, for "ml. of each" read -- ml. --; line 21, for "$C_{23}H_{26}ClFN_2O_2$:" read -- $C_{23}H_{26}ClFN_2O_2$: --; lir 25, for "yield" read -- yielded --. Column 21, line 18, for "139.5 C." read -- 139.5° C. --. Column 23, line 15, for "ispropoxy" read -- isopropoxy; line 52, for"4-Isopropyl" read 4'-Isopropyl --.

Signed and sealed this 23rd day of November 1971.

(SEAL)
Attest:

EDWARD M.FLETCHER,JR.           ROBERT GOTTSCHALK
Attesting Officer                Acting Commissioner of Patents